Feb. 27, 1951     N. F. ANDREWS ET AL     2,543,310
VEHICLE, ESPECIALLY FOR AGRICULTURAL PURPOSES
Filed Nov. 13, 1947     2 Sheets-Sheet 2
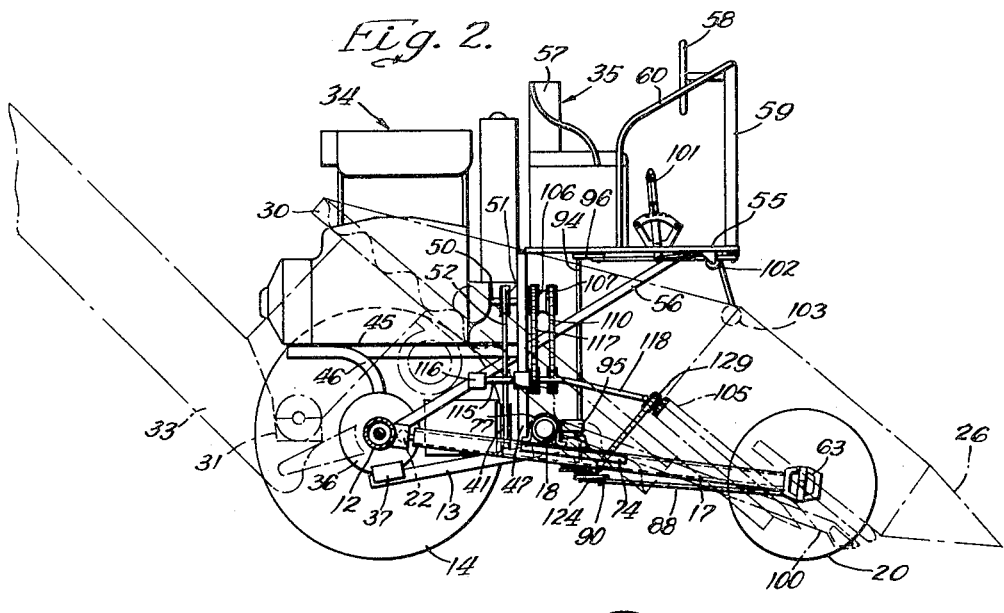
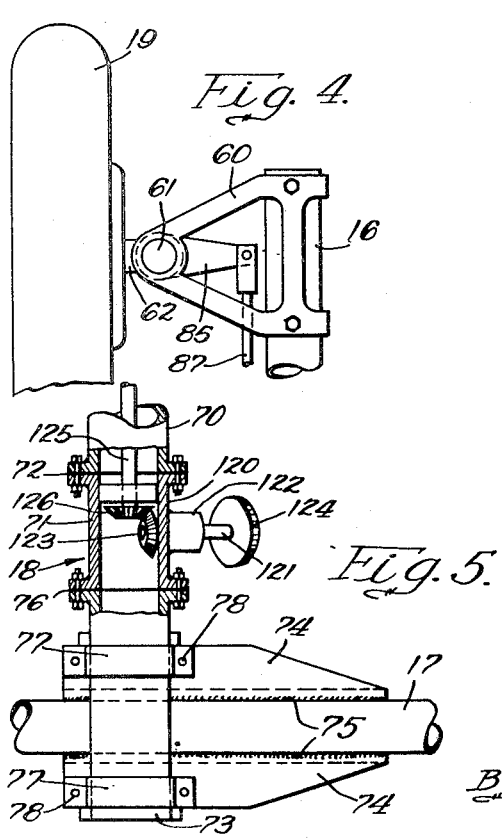
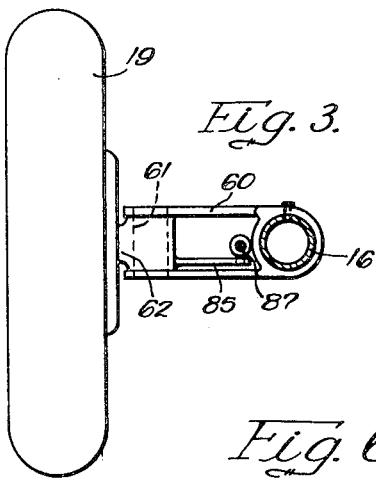
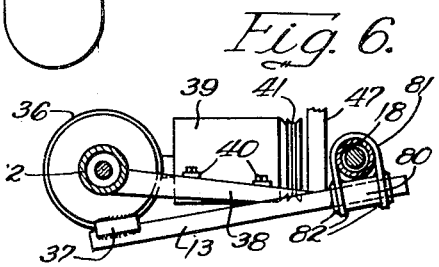
Inventors:
Norman F. Andrews
Russell J. Dort Patented Feb. 27, 1951

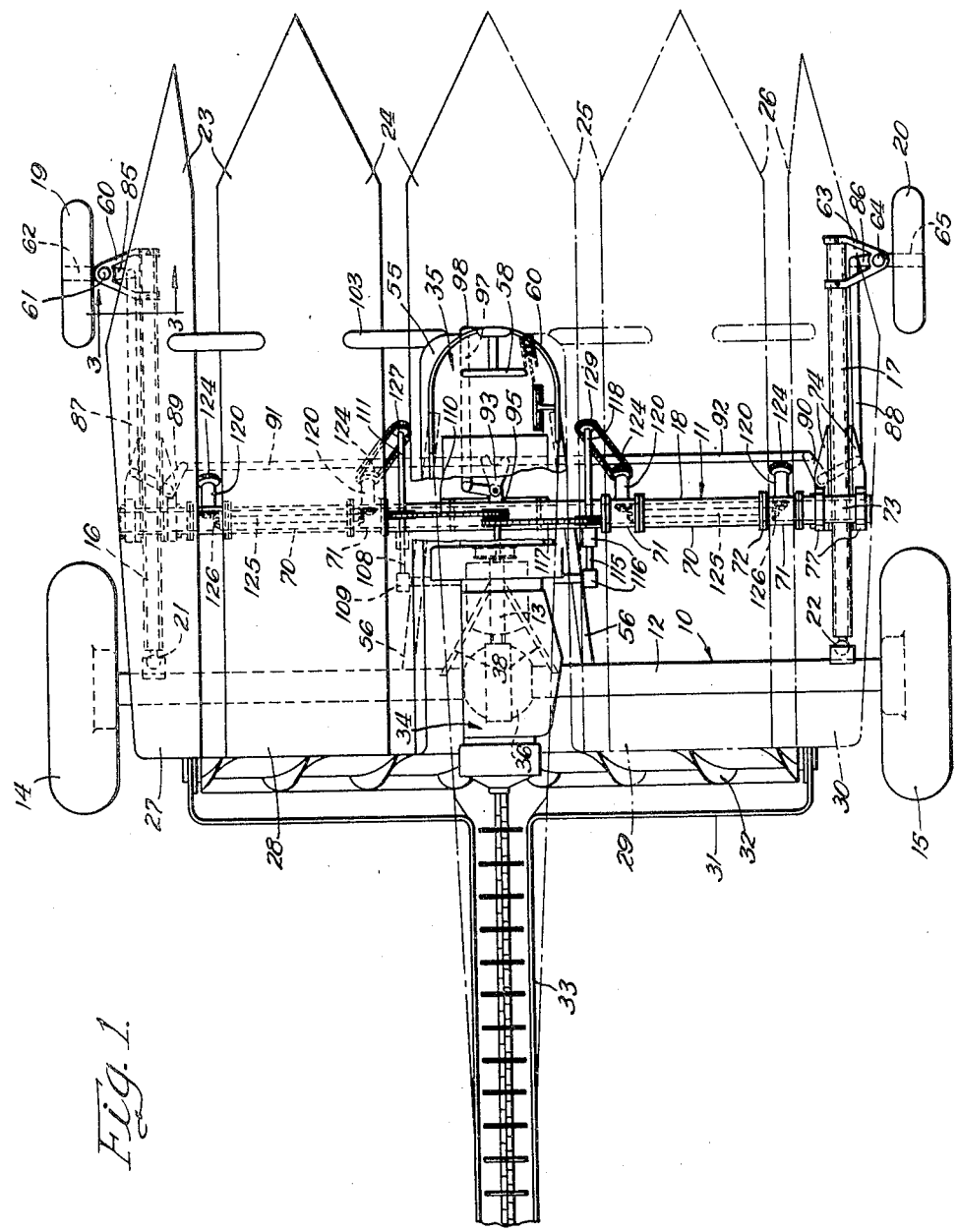

2,543,310

UNITED STATES PATENT OFFICE 2,543,310

VEHICLE, ESPECIALLY FOR AGRICULTURAL PURPOSES

Norman F. Andrews, Moline, Ill., and Russell L. Dort, Davenport, Iowa, assignors to Deere & Company, Moline, Ill., a corporation of Illinois Application November 13, 1947, Serial No. 785,702

6 Claims. (Cl. 180—53)

This invention relates to a new and improved vehicle especially adapted for agricultural purposes and is principally designed from the standpoint of providing a flexible frame to which may be attached or on which may be carried a variety of agricultural implements, and particularly implements or machines of the harvester type.

In the past a great deal of design effort has been centered on providing agricultural implements especially adapted for attachment to or mounting on tractors of existing types. In many cases the program has been eminently successful, the only disadvantage being that in many cases the use of a particular implement with a tractor is tantamount to withdrawing the tractor from use for other purposes because of the difficulty with which the implement is dismounted therefrom. In some instances the complicated nature of the implement or the means for attaching the same to or mounting the same on the tractor virtually prevents convenient disassembly of the two units, in which case the owner of the tractor and implement is compelled to provide himself with an additional tractor, obviously at considerable additional expense. In other instances the special design of the implement to adapt the same for attachment to or mounting on the tractor detracts somewhat from the efficient operation of the machine as a unit and the inefficiency must be disregarded as compensated for by the desirability of operation of the tractor and implement as a unit.

According to the present invention, it is an important object to provide an inexpensive vehicle frame which will take the place of a tractor for carrying implements. To this end, many of the expensive design features of a tractor may be eliminated and the frame of the vehicle may take the form of relatively simple frame structure including a power plant for propelling the same and for driving the moving parts of any agriculture machine that is attached thereto or mounted thereon.

Another object of the invention relates to the provision of a vehicle frame structure in which a structural part of the frame also serves as means for carrying an agricultural implement or machine. In this respect it is also contemplated, in one form of the invention, that the structural members serve also to carry or enclose driving means for the traction wheels of the vehicle. An important feature of the invention is to provide a frame that is flexible for the purpose of accommodating vertical movement of the frame components relative to each other as the wheels follow varying ground contour. In another aspect, the invention involves the mounting of a power plant and operator's station on the frame in such manner as to accommodate flexing of the frame components.

Other important objects and desirable features of the invention will become apparent as the disclosure of the preferred form thereof is completely made in the following detailed description, taken in conjunction with the accompanying sheets of drawings, in which Figure 1 is a plan view of the vehicle, a portion of the implement, here shown as a corn picker, being illustrated in broken lines;

Figure 2 is a side elevational view of the structure shown in Figure 1, the near rear wheel being removed to more clearly illustrate the frame structure;

Figure 3 is an enlarged transverse sectional view taken substantially on the line 3—3 of Figure 1 and showing a front wheel support;

Figure 4 is a plan view of the structure shown in Figure 3;

Figure 5 is an enlarged fragmentary plan view, partly in section, showing the connection between a pair of frame components and the housing of part of the driving means; and Figure 6 is a fragmentary view in detail showing the supporting of the change speed gear housing and related frame members.

In general, the vehicle frame chosen for the purposes of the present illustration comprises a frame including a first wheel-supported frame section 10 and a second wheel-supported frame section 11. The first section may be referred to briefly as including a transverse frame member 12 and a longitudinal frame member 13, the two frame members being arranged and interconnected so as to form generally a T. The frame section 10 is supported at opposite ends of the member 12 for travel over the ground, preferably by means of left and right hand ground-engaging means in the form of traction wheels 14 and 15. The second frame section 11 may be referred to briefly as comprising a plurality of frame members forming generally an H, including left and right hand side members 16 and 17 and a transverse cross member 18. The front ends of the members 16 and 17 are carried respectively on ground-engaging means such as steerable wheels 19 and 20, and the rear ends of the members are articulately connected to the first frame 10 by means including universal joints 21 and 22, respectively, each being preferably of the ball and socket type. The transverse member 18, or crossbar of this frame, serves to carry an agricultural implement, here shown as a harvester of the corn picker type comprising a four-row picker having picking units 23, 24, 25 and 26. The picking units respectively include rearwardly and upwardly inclining elevators 27, 28, 29 and 30, each of which empties into a transversely extending hopper 31 which includes a transverse auger 32 operable to convey harvested crops toward the center of the hopper 31 whereat such crops are delivered to the receiving end of a rearwardly and upwardly inclining wagon elevator 33. The vehicle is propelled by a power plant 34 carried above the frame section 10 and rearwardly of a longitudinally extending operator's station 35.

The foregoing will suffice for a general and brief description of the agricultural vehicle. Consideration will now be given to the detail structure of a preferred form of the invention.

The transverse member 12 of the first frame section 10 provides a transverse axle structure including intermediate its ends a gear housing 36, which may contain conventional gearing including differentially drven axles for the traction wheels 14 and 15. Such mechanism has not been illustrated, since it forms no specific part of the present invention. The longitudinal member 13 that provides the leg of the T frame is rigidly connected at its rear end to a bottom portion of the gear casing 36 by means here shown as including a welded structural element 37 (Figure 6). The rigidity of the frame member 13 with respect to the transverse member 12 is further increased by means of a pair of diagonal brace members 38 (Figures 1 and 6) rigidly secured, as by welding, at their opposite ends to the members 12 and 13.

A gear housing 39 is located ahead of the gear casing 36 and is appropriately supported by pads 40 on the diagonal brace members 38. The gear casing 39 may include conventional change-speed gearing (not shown) connected in any suitable manner to the differential gearing in the casing 36 and including at its forward end a driven pulley 41, the purpose of which will presently appear.

The power plant 34 is wholly supported on the frame section 10; that is to say, the power plant is preferably independent of any support on the frame section 11. This result is accomplished in the present case by means of a power plant supporting structure 45 carried by supporting members 46 (only one of which is shown in Figure 2) on an upper portion of the gear housing 36. The supporting structure 45 extends longitudinally of the vehicle and is supported at its forward end by a pair of vertical supports 47 (only one of which is shown in Figure 2). The supports 47 are rigidly carried at their lower ends on the longitudinal member 13 of the T (Figure 6) and extend upwardly ahead of the power plant 34 in proximity to the operator's station 35.

The power plant 34 is here illustrated as being an internal combustion engine having a forwardly extending driving shaft 50 which may be an extension of the engine crank shaft (Figure 2). A driving pulley 51 is keyed to the shaft 50 and a driving belt 52 is trained about the pulleys 51 and 41, the latter having been described in connection with the change-speed gar housing 39. Driving torque developed by the power plant 34 is thus transmitted to the traction wheels 14 and 15 for the purpose of propelling the vehicle over the ground. Inasmuch as the power plant 34 and gear casing 39 are both rigidly carried as unitary parts of the frame section 10, there will be no variation between the shaft 50 and pulley 41 and there will thus be no increase or decrease in the length of the belt 52. The supporting of the power plant 34 wholly on the frame section 10 and independent of any support on the frame section 11 is important from the standpoint of eliminating twisting strains on the power plant and its supporting structure resulting from relative movement between the frame sections 10 and 11 because of their articulate interconnecting means 21 and 22.

The operator's station 35 is also preferably formed as a unitary part of the frame section 10 and in this manner, like the support of the power plant 34, will not be subject to strains set up by relative movement between the two frame sections. The supporting of the operator's station 35 is accomplished by means of a longitudinal horizontal platform 55 the rear end portion of which is carried at the upper end portions of the vertical supporting members 47 (Figure 2) and the forward portion of which is supported on a pair of rearwardly and downwardly extending supporting members 56 (Figures 1 and 2). The rear ends of the members 56 may be rigidly secured to the transverse member 12 of the frame 10. The operator's station 35 includes, and the platform 55 carries, a seat 57 ahead of which is carried a steering wheel 58 mounted on vertical supporting structure 59 at a forward portion of the platform 55. A guard rail 60 substantially encircles the forward portion of the platform. The operating connections between the steering wheel 58 and the steerable wheels 19 and 20 will be set forth below.

The following will pertain to a description of a preferred form of the H frame 11. The side frame members 16 and 17 are preferably in the form of torque tubes and reference thereto as such will be sometimes made hereafter. The forward end of the left hand torque tube 16 is connected in load-supporting relationship to the left hand front wheel 19 by a transverse yoke 60 which provides a lever arm rigidly connected at its inner end to the torque tube 16 and thus fulcrums on the principal axis of the torque tube. The outer end of the yoke receives a vertical spindle 61 at the lower end of which is a stub axle 62 on which the wheel 19 is journaled. The forward end of the right hand torque tube 17 is similarly associated with the right hand front wheel 20 by means of a yoke 63, spindle 64 and stub axle 65.

The universal or ball and socket connections 21 and 22 between the H frame 11 and T frame 10 provide for articulation between the frame sections to the extent that each torque tube 16 or 17, if uncontrolled, would have movement with respect to the transverse member 12 about vertical, transverse and longitudinal axes. It is an important feature of the present invention that such relative movement is provided for but is controlled or stabilized. In this respect the transverse member 18 providing the crossbar of the H serves as means for cross connecting the torque tubes 16 and 17 in such manner as to prevent uncontrolled movement of the torque tubes.

As best shown in Figures 1 and 5, the transverse member 18 is preferably of tubular construction made up of a plurality of long and short sections 70 and 71, respectively. These sections may be flanged, as at 72, and rigidly interconnected to provide the unitary transverse member 18. The assembled member 18 includes at each of its opposite ends a relatively long coaxial bearing member 73 disposed above and resting on the proximate torque tube 16 or 17 (Figures 1 and 5). Since both ends of the member 18 and the connection thereof to the torque tubes 16 and 17 are the same, only one side will be described, reference being had to Figure 5 for this purpose, it being understood that similar parts are provided at the opposite side of the vehicle. The torque tube 17 is provided intermediate its ends with a pair of longitudinally running angle members 74 having their upper flanges lying in a common horizontal plane coincident with the uppermost element of the cylindrical surface of the member 17. The members 74 may be rigidly secured, as by welding at 75, to the member 17. The bearing member 73 at the end of the transverse member 18 includes a flanged connection 76 with the proximate short tubular or housing section 71 and further provides a bearing on a transverse axis with respect to the torque tube 17 and its associated angle members 74. The bearing between the latter mentioned components is accomplished by means of a pair of transversely spaced bearing straps 77, generally of U-shape, embracing the bearing portion 73, the legs of the straps being rigidly secured at 78 to the angle members 74. Since the angle members 74 are rigidly connected to both the torque tube 17 and the bearing straps 77, and since the straps are rather widely spaced apart, a suitable bearing connection is provided between the torque tube 17 and the transverse member 18, providing, first, for rocking movement of the member 18 about its principal axis and, second, preventing rotation of the torque tube 17 when subjected to vertical load. The same is true of the connection at the opposite side of the vehicle. In other words, when vertical loading of the torque tube 16 or 17 occurs because of load placed upon the vehicle or because of rise and fall of the wheels 19 and 20, the members 16 and 17 are prevented from rotating or twisting freely about their principal axes; instead, the torque is taken by the torque tubes themselves and reaction is through the transverse member 18. In this manner the wheels 19 and 20 are torsionally sprung and resort to complicated leaf or coil springs is eliminated. It will be further noted that the transverse member 18 and its connection to the torque tubes 16 and 17 prevents lateral or "diamond" displacement of the torque tubes. At the same time the assembled member 18 is preferably constructed with sufficient torsional resiliency to permit the torque tubes 16 and 17 to rise and fall independently as the wheels 19 and 20 encounter varying ground contour. The rise and fall of the members 16 and 17 will, of course, be respectively about the transverse axes provided by the connections 21 and 22.

For the purpose of preventing vertical collapse of the frame sections 10 and 11 about a generally transverse axis through the connections 21 and 22, and further for the purpose of stabilizing the relative movement between the two frame sections, the forward end of the member 13 of the T frame 10 is connected in load-supporting relationship to an intermediate portion of the assembled member 18. The connection is so constructed and arranged as to accommodate relative vertical oscillation between the frame sections. As best shown in Figure 6, the forward end of the longitudinal member 13 of the T frame carries thereon a bearing sleeve 80. A U-shaped strap 81 embraces the intermediate portion of the member 18 and has its legs rigidly secured in longitudinally spaced relation, as by welding at 82, to the bearing sleeve 80. The connections 80—81—82 between the members 13 and 18 interconnect the frame sections 10 and 11 in load-transfer relationship and at the same time provide for relative vertical oscillation of the frame sections about a generally fore and aft axis, in the present case the principal axis of the member 13. Although the vehicle frame, comprising the T and H sections, may have considerable flexibility so that the vehicle may follow varying ground contour without setting up undesirable stresses and strains, the flexibility is controlled or stabilized, thus adapting the vehicle to many purposes and uses for which the ordinary agricultural tractor would be unsuitable.

The vertical spindles 61 and 64 of the left and right hand wheels 19 and 20, respectively, carry inwardly extending steering arms 85 and 86. These arms are connected respectively by longitudinally extending drag links 87 and 88 to bell cranks 89 and 90 pivoted respectively on the inner sides of the torque tubes 16 and 17. The bell cranks are in turn connected by a pair of coaxial transverse tie rod members 91 and 92 to a bell crank 93 (Figure 1) keyed to the lower end of a vertical steering shaft 94 located below the operator's station 35 and forwardly of the transverse member 18 (Figures 1 and 2). The steering shaft 94 may be suitably journaled in a bearing 95 that extends forwardly from an intermediate portion of the transverse member 18. The upper end of the shaft 94 may have keyed thereto a steering arm 96 which is connected by a longitudinally and forwardly extending link 97 to a steering arm 98 controlled by the steering wheel 58 by any suitable mechanism, the details of which have not been illustrated.

As previously stated the transverse assembled member 18 is connected to the torque tubes 16 and 17 in a manner providing for rocking of the member 18 about its principal axis. This feature is of considerable importance in the preferred form of the invention illustrated for the purpose of adapting the vehicle for the carrying of a wide variety of agricultural implements or machines, in the present case the member 18 carrying the corn picker. As is well known to those skilled in the art, the conventional corn picker construction includes a transverse member carrying the picker units for vertical movement about a transverse axis. The particular mounting of the transverse member 18 in the present case provides such a support. In this respect it is an important object of the invention to adapt the vehicle for the carrying of conventional type implements and, accordingly, there has been illustrated a picker having conventional parts. For example, each of the units 23, 24, 25 and 26 may include the forwardly and downwardly inclining supporting structure, such as indicated at 100 in Figure 2. The rear or upper portion of this supporting structure may be suitably connected to the transverse member 18, the details of the attaching structure having been omitted, inasmuch as a wide variety of such structural details are available to those skilled in the art and the particular mounting forms no specific part of the present invention. The mounting of the supporting structures 100 on the transverse assembled member 18 provides for vertical movement of the picker units about the transverse axis of the member 18 and thus enables the picker units to rise and fall in accordance with varying ground contour. At the same time this manner of supporting the picker units provides for raising and lowering the picker units between working and transport positions. The means in the present case for accomplishing raising and lowering of the picker units is shown as including a hand lever 101 carried on the operator's platform 55 and a pulley and cable connection 102 to a transverse member in the form of a pipe 103 that interconnects the picker units 23, 24, 25 and 26. Here again, the details of the raising and lowering means form no specific part of the present invention, and that means illustrated is only representative of many types of similar means that could be utilized, the purpose of the illustration, like the illustration of the steering mechanism, being only to demonstrate the desirable location of the operator's station and the flexibility thereof in enabling the operator to control the vehicle-mounted implement.

The power plant 34 provides, in addition to means for propelling the vehicle, a power source for driving movable or drivable parts of the implement or machine. In the present illustration of the generally conventional picker, each picker unit may include a plurality of snapping rolls, such as those indicated at 105 in Figure 2.

The power source in the present case includes a further forward extension of the power shaft 50 and this extension has keyed thereto a pair of driving sprockets 106 and 107 (Figures 1 and 2). There is provided at the left hand side of the operator's station 35 a longitudinal shaft 108 suitably carried, as at 109, in bearings on the supporting structure 45 and 56. The shaft 108 is driven by means of a sprocket and chain connection 110 by a forward sprocket 107 on the power shaft 50. The forward end of the shaft 108, thus rotated, is connected to a forwardly and downwardly inclining shaft 111 the forward end of which may be connected in any conventional manner to the snapping rolls for the picker unit 24.

The supporting structure 45—56 carries at the right hand side of the power plant and operator's station a longitudinal shaft 115 similar to the shaft 108 previously described. The supporting structure 45—56 may be provided with bearings 116 for the purpose of journaling the shaft 115. This shaft is drivingly associated with the sprocket 106 on the power shaft 50 by means of a sprocket and chain connection 117 and is further connected at its forward end to a forwardly and downwardly inclining drive shaft 118, which is similar to the driving shaft 111 previously described.

Each of the short sections 71 of the assembled transverse member 18 comprises a gear housing, indicated generally by the numeral 120, and best shown in Figure 5 as including power take-off means in the form of a short forwardly extending shaft 121 journaled at 122 and having keyed to opposite ends, respectively, a bevel gear 123 and a sprocket 124. The bevel gears 123 of each adjacent pair of gear housings 120 are drivingly interconnected by a shaft 125 having at its opposite ends bevel pinions 126. The sprocket 124 of the gear assembly next adjacent the left hand driving shaft 111 is connected to the driving shaft 111 by means of a sprocket and chain connection 127 and in this manner drive is carried from the left hand driving shaft 108, through the shaft 111 and thence to the outermost left hand gear housing 120, wherein the driving sprocket 124 is adapted to be connected to the snapping rolls for the picker unit 23.

The innermost right hand gear assembly has its sprocket 124 connected by means of a sprocket and chain connection 129 to the forward end of the snapping roll drive shaft 118 at the right hand side of the operator's station 35. Power is thus transferred from the shaft 115 to the shaft 118 and thence to the outermost right hand sprocket 124, the latter being connected to the snapping rolls (not shown) for the right hand outermost picker unit 26. It will be understood in each case that the outermost left hand and right hand sprockets 124 are connected to their proximate snapping rolls by means of sprocket and chain connections similar to those described at 127 and 129.

Inasmuch as the shafts 125 are coaxial with the assembled transverse member 18 and are enclosed within the sections 70 and 71 thereof, there will be no undesirable variations in the driving connections as the picker units 23, 24, 25 and 26 rise and fall in response to varying ground contour. The location of the shaft 125 on the axis of the assembled member 18 is important from the standpoint just referred to and is further important from the standpoint of providing an enclosure for the shaft and the associated bevel pinions 123 and 126. Further than this, the illustration is rather schematic, inasmuch as the connections to the snapping rolls, for example, form no specific part of the present invention and many variations of such drive connections are well known to those skilled in the art.

The preferred example of the invention illustrated and described will indicate the several features and objects of the invention, such as flexibility of the frame sections during operation, the mounting of the operator's station and power plant, the driving mechanism for the vehicle and the drivable implement part, and the general adaptability and economy of the vehicle in use and manufacture. Various other features will undoubtedly occur to those skilled in the art, as will various modifications and alterations in the preferred structure illustrated. It is, therefore, not desired to limit the invention by the precise details set forth.

We claim:

1. A vehicle, comprising a first frame section having frame members providing a T wherein the crossbar and leg are rigidly interconnected and the former extends transversely and the latter longitudinally of the vehicle; means supporting the crossbar for travel on the ground; a second frame section in the form of an H wherein the legs of the H are torque tubes and the crossbar of the H is connected to the legs by means providing for both vertical and torsional loading of the latter, said means further providing for rocking of said crossbar generally about its principal axis with respect to said legs; means articulately connecting one end of each leg of the H to the crossbar of the T; means supporting the other ends of the legs of the H on the ground for travel thereover; and means articulately connecting the leg of the T in vertical load-supporting relation to the crossbar of the H.

2. A vehicle, comprising a first frame section having frame members providing a T wherein the crossbar and leg are rigidly interconnected and the former extends transversely and the latter longitudinally of the vehicle; means including a traction element supporting the crossbar for travel on the ground; a second frame section in the form of an H wherein the legs of the H are torque tubes and the crossbar of the H is connected to the legs by means providing for both vertical and torsional loading of the latter; means articulately connecting one end of each leg of the H to the crossbar of the T; means supporting the other ends of the legs of the H on the ground for travel thereover; means including a pivot on a longitudinal axis connecting the leg of the T in vertical load-supporting relation to the crossbar of the H; said leg of the T being rigid throughout its length and said pivot being rigid with said leg to prevent the imposition of twisting loads on the crossbar of the H because of torque developed by the traction element.

3. An agricultural vehicle, comprising a T frame section and an H frame section arranged with the crossbar of the T and H generally in parallelism transversely of the vehicle and wherein the crossbar of the H includes a housing portion, and with the legs of the T and H generally in parallelism longitudinally of the vehicle; means interconnecting the leg of the T and the crossbar of the H; means interconnecting the crossbar of the T and each leg of the H; means carrying the H frame section for travel over the ground; means carrying the T frame section for travel over the ground; a power source on at least one of the frame sections; power take-off means in the housing and including a power output part projecting outside the housing; and driving means connected between the power source and the power take-off means and having a driving part entering the housing and connected to the power take-off means.

4. A vehicle, comprising: a frame including a first frame section having a transverse member carried at its opposite end portions for travel on the ground; a second frame section including a pair of laterally spaced fore and aft extending members, one end portion of each of which is proximate to said transverse member and the opposite end portion of each of which is remote from said transverse member; means including universal joint connections respectively connecting said proximate end portions of the fore and aft members to the transverse member providing for rise and fall of the fore and aft members relative to the transverse member, means respectively at the remote end portions of the fore and aft members for carrying said members for travel on the ground, said means including load-supporting connections tending to twist said fore and aft members respectively about their principal axes; a second transverse member between the fore and aft members; means respectively connecting opposite end portions of said second transverse member to the fore and aft members to resist twisting of the latter; and a structural member connected between said first and second transverse members for stabilizing the second transverse member and the fore and aft members both laterally and vertically.

5. The invention set forth in claim 4, further characterized in that: the structural member is rigidly connected to one transverse member and the connection thereof to the other transverse member includes a pivot generally on a fore and aft axis.

6. A vehicle, comprising: a first frame section generally in the form of a T wherein the crossbar of the T provides a transverse member having wheel means at opposite ends thereof, and the leg of the T provides a fore and aft extending member rigidly connected to the transverse member; a second frame section generally in the form of an H wherein the legs of the H provide a pair of laterally spaced, fore and aft extending frame bars and the crossbar of the H provides a transverse member generally paralleling and spaced longitudinally from the transverse member of the T; means articulately connecting opposite end portions of the crossbar of the H respectively to the legs of the H to provide a pivot generally on the principal axis of said crossbar of the H; means articulately connecting one end of each frame bar to the transverse member of the T; wheel means respectively supporting the other ends of said frame bars; and means connecting the fore and aft member of the T to the transverse member of the H intermediate the ends of the latter and in substantial vertical alinement with the aforesaid transverse pivot, and constructed and arranged to stabilize the frame sections both laterally and vertically and at the same time to provide for vertical oscillation of one frame section with respect to the other about a substantially fore and aft axis.

NORMAN F. ANDREWS.
RUSSELL L. DORT.

REFERENCES CITED

The following references are of record in the file of this patent:

UNITED STATES PATENTS

| Number | Name | Date |
|---|---|---|
| 666,592 | Atkins | Jan. 22, 1901 |
| 1,157,803 | Pfouts | Oct. 26, 1915 |
| 2,152,273 | Otto | Mar. 28, 1939 |
| 2,191,211 | Krotz | Feb. 20, 1940 |
| 2,228,454 | Hamilton | Jan. 14, 1941 |
| 2,343,800 | Rauch | Mar. 7, 1944 |

FOREIGN PATENTS

| Number | Country | Date |
|---|---|---|
| 7,758 | Great Britain | Apr. 26, 1900 |